Patented May 22, 1934

1,960,184

UNITED STATES PATENT OFFICE

1,960,184

DERIVATIVES OF THE DI-HYDROXY-BENZENES AND PROCESS FOR MANUFACTURE OF SAME

Marcus Guggenheim, Basel, Switzerland, assignor to Hoffmann-La Roche Inc., Nutley, N. J., a corporation of New Jersey No Drawing. Application May 5, 1933, Serial No. 669,619. In Germany May 14, 1932

10 Claims. (Cl. 260—99.20)

The mono-ethers of the di-hydroxy-benzenes of the general formula $C_6H_4(OH)OR$, R being an aryl, aralkyl or an alkyl with more than 4 carbon atoms, are known as very strong disinfectants (Klarmann, Journal of the American Chemical Society, vol. 54, 1932, p. 1206). They are however not well suited for internal use, because they are scarcely soluble in water, have an exceedingly disagreeable taste and irritate the mucous membranes of the mouth.

It has now been found, that the salts of the acid phosphoric acid esters of these di-hydroxy-benzene-mono-ethers have only a very slight taste and no irritating effect. They are slowly saponified in the organism. The salts of the acid phosphoric acid esters are obtained by boiling the mono-ethers of the di-hydroxy-benzenes with phosphorous-oxyhalogenides, saponifying the halogenides of the acid phosphoric acid esters of the di-hydroxy-benzene-mono-ethers and converting the free acid phosphoric acid esters of the di-hydroxy-benzene-mono-ethers by neutralization into their salts. For obtaining the halogenides of the acid phosphoric acid esters of the di-hydroxy-benzene-mono-ethers it may be advantageous to use catalysts, such as phosphorous-pentachloride or quinoline, but the reaction also sets in without these catalysts, if the heating is continued long enough. According to the proportions of the starting material and the phosphorus-oxyhalogenide used the halogenides of the mono-esters or of the di-esters are obtained. With a large excess of phosphorus-oxyhalogenide practically only the halogenides of the mono-esters are obtained. By saponifying the acid chlorides with warm water only, the corresponding mono-ether-acids are obtained from the halogenides of the mono-esters. By saponifying with alkali ester-acids of the type of pyrophosphoric acid are obtained. Of all these substances the salts of the mono-ester-acids are the most suitable owing to their ready crystallization and the ease with which the intermediate compounds can be isolated. The reactions taking place in their preparation by the above method can be represented by the following equations:

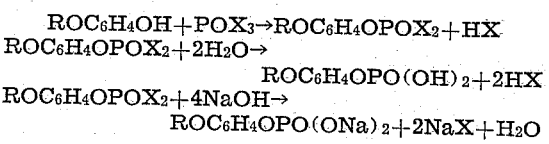

In these equations R represents a substituted or unsubstituted aryl, aralkyl or an alkyl with more than 4 carbon atoms, X a halogen.

The new compounds are to be used as internal disinfectants.

Example 1

20 parts by weight of hydroquinone-monophenylether are boiled with 200 parts by weight of pure distilled phosphorus-oxychloride for 100 hours with a reflux condenser. After removing the excess of phosphorus-oxychloride, distillation is continued in vacuo and 28 parts by weight of mono-p-phenoxy-phenyl-phosphoric-ester-acid-dichloride, boiling at 206–209° C. under 11 mm. pressure, are obtained. The compound melts at 53° C. The same compound may be obtained with the same yield, if 20 parts by weight of hydroquinone-monophenylether are boiled with 200 parts by weight of phosphorus-oxychloride and 1 part by weight of phosphorus-pentachloride for 3½ hours with a reflux condenser, and the chloride thus obtained is purified by distillation.

10 parts by weight of the acid chloride thus obtained are stirred with 40 parts by weight of water for 3 hours at 60° C. After cooling the mono-p-phenoxyphenyl-phosphoric-ester-acid is isolated by shaking with ether. After removing the ether by evaporation a slowly congealing oil remains, which crystallizes from chloroform in leaflets melting at 127–129° C.

In order to obtain the di-sodium salt of the mono-p-phenoxyphenyl-phosphoric-ester-acid the acid is dissolved in alcohol and sodium-ethylate in alcoholic solution is added until the reaction becomes neutral. The di-sodium salt is immediately precipitated in crystalline form. It is easily soluble in water. With calcium-chloride the aqueous solution yields a precipitate of the difficultly soluble calcium salt of the acid.

The hexamethylentetramine salt is obtained by dissolving equimolecular quantities of hexamethylentetramine and mono-p-phenoxyphenyl-phosphoric-ester-acid in warm alcohol. On cooling the salt crystallizes in the form of colorless needles.

Example 2

20 parts by weight of 1-hydroxy-2-chloro-4-phenoxy-benzene are boiled with 200 parts by weight of phosphorus-oxychloride and 0.2 part by weight of quinoline for 3½ hours with a reflux condenser. After removing the excess of phosphorus-oxychloride by distillation, 24 parts by weight of 1-hydroxy-2-chloro-4-phenoxybenzene-phosphoric-ester-acid-chloride are distilled from the residue, which boils at 216–219° C. under 11 mm. pressure.

10 parts by weight of this acid chloride are stirred with 40 parts by weight of water for 5 hours at 85° C. After cooling the mono-1-hydroxy-2-chloro-4-hydroxyphenyl - phosphoric-ester-acid is isolated by shaking with ether and after evaporating the ether it is recrystallized from carbon-tetra-chloride. It melts at 98–100° C.

The sodium salt is obtained from an alcoholic solution in the form of a colorless powder in the manner described in Example 1.

*Example 3*

20 parts by weight of brenzcatechin-monophenylether are boiled with 200 parts by weight of phosphorus-oxychloride, 1 part by weight of phosphorus-pentachloride and 0.2 part by weight of quinoline for 3½ hours with a reflux condenser. By distillation 25 parts by weight of mono-o-phenoxyphenyl-phosphoric - ester - acid -chloride boiling at 195–198° C. under 11 mm. pressure are obtained.

10 parts by weight of this acid chloride are stirred with 40 parts by weight of water for 4 hours at 60° C. and the mono-o-phenoxyphenyl-phosphoric-ester-acid is isolated by shaking with ether and recrystallized from carbon-tetrachloride. It melts at 121–123° C.

The ammonium salt is obtained by dissolving the acid in ether and adding ammonia. The salt is immediately precipitated in crystalline form.

*Example 4*

20 parts by weight of hydroquinone-monobenzyl-ether, 200 parts by weight of phosphorus-oxychloride and 1 part by weight of phosphorus-pentachloride are boiled for 3½ hours with a reflux condenser. After evaporating the excess of phosphorus-oxychloride the remaining acid chloride is stirred with the 5-fold quantity of water for 30 minutes at 90–100° C. and after cooling the mono - p - benzyl - hydroxyphenyl - phosphoric - ester-acid is extracted by shaking with ether. The ether is then shaken with dilute soda-solution and the acid is obtained in crystalline form by precipitating with dilute hydrochloric acid. After recrystallization from a mixture of carbon-tetrachloride and chloroform it melts at 122–123° C.

The ammonium salt is obtained in the manner described in Example 3.

*Example 5*

29 parts by weight of hydroquinone-mono-isoamyl-ether are boiled with 320 parts by weight of phosphorus-oxychloride, 0.3 part by weight of quinoline and 1 part of phosphorus-pentachloride for 3½ hours with a reflux condenser. After removing the excess of phosphorus-oxychloride by distillation, 31 parts by weight of mono-p-isoamyl-hydroxyphenyl-phosphoric - ester-acid-dichloride melting at 182–184° C. under 11 mm. pressure are obtained by fractionation. By saponifying the acid chloride with warm water according to the directions given in Example 1 the mono-p-isoamyl-hydroxyphenyl-phosphoric-ester-acid is obtained which crystallizes from carbon-tetrachloride and melts at 55–58° C.

The ammonium salt is obtained in the manner described in Example 3.

*Example 6*

10 parts by weight of resorcinol-mono-phenylethyl-ether are dissolved with 15 parts by weight of phosphorus-oxychloride and 50 parts by weight of chloroform and 8 parts by weight of diethylaniline are dropped in at −5 to 0° C. After being left to stand for a night the solvent and the excess of phosphorus-oxychloride are distilled off on the water-bath at reduced pressure. The residue is taken up with ether, filtered from the diethylaniline-hydrochloride and the ether removed by distillation. The dichloride is then saponified with water and the bicarbonate-soluble part isolated. The mono-(m-β-phenyl-ethyl-hydroxy-phenyl-)phosphoric-ester-acid, a rather thick oil, is taken up in absolute alcohol and the disodium salt is obtained in powdery white form by treatment with sodium-ethylate. The sodium salt is easily soluble in water and reacts neutrally.

Instead of diethylaniline phosphorus-pentachloride may be used.

11 parts by weight of resorcinol-mono-phenylethyl-ether are heated with 20 parts by weight of phosphorus-oxy-chloride with the addition of 0.1 part of phosphorus-penta-chloride, until at 90–100° C. the development of hydrochloric acid stops. The reaction product is then heated to boiling point and the excess of phosphorus-oxychloride removed by distillation in vacuo. The product is then treated in the same manner as previously described.

I claim:

1. The phosphoric-acid-ester-derivatives of dihydroxy-benzenes of the formula

R being a substituted or unsubstituted phenyl, phenalkyl, or a saturated alkyl radical with more than four carbon atoms, forming well crystallized easily water soluble salts, and constituting good internal disinfectants.

2. The mono-p-phenoxyphenyl-phosphoric-ester-acid crystallizing from chloroform in leaflets melting at 127–129° C., forming a well crystallizing, easily water-soluble di-sodium salt and being a good internal disinfectant.

3. The process for the manufacture of ester-derivatives of di-hydroxy-benzenes, which consists in heating di-hydroxy-benzene-mono-ethers of the general formula $C_6H_4(OH)OR$, R being a substituted or unsubstituted phenyl, phenalkyl, or saturated alkyl radical with more than 4 carbon atoms, with phosphorus-oxyhalogenides and saponifying the acid halogenides.

4. The process for the manufacture of ester-derivatives of di-hydroxybenzenes, which consists in heating di-hydroxy-benzene-mono-ethers of the general formula $C_6H_4(OH)OR$, R being a substituted or unsubstituted phenyl, phenalkyl, or saturated alkyl radical with more than 4 carbon atoms, with phosphorus-oxyhalogenides in the presence of a catalyst selected from the group which consists of phosphorous pentachloride, quinoline, and diethylaniline, and saponifying the acid halogenides.

5. The process for the manufacture of ester-derivatives of di-hydroxy-benzenes, which consists in heating di-hydroxy-benzene-mono-ethers of the general formula $C_6H_4(OH)OR$, R being a substituted or unsubstituted phenyl, phenalkyl, or saturated alkyl radical with more than 4 carbon atoms, with phosphorus-oxychlorides and saponifying the acid chlorides.

6. The process for the manufacture of ester-derivatives of di-hydroxy-benzenes, which consists in heating di-hydroxy-benzene-mono-ethers of the general formula $C_6H_4(OH)OR$, R being a substituted or unsubstituted phenyl, phenalkyl, or saturated alkyl radical with more than 4 carbon atoms, with phosphorus-oxychlorides in the presence of a catalyst selected from the group which consists of phosphorus pentachloride, quinoline, and diethylaniline, and saponifying the acid chloride.

7. The process for the manufacture of mono-p-phenoxy - phenyl - phosphoric-ester - acid, which consists in heating hydro-quinone-monophenyl-ether with phosphorus-oxyhalogenides and saponifying the acid halogenide.

8. The process for the manufacture of mono-p-phenoxy-phenyl-phosphoric-ester-acid, which consists in heating hydroquinone-mono-phenyl-ether with phosphorus-oxyhalogenides in the presence of a catalyst selected from the group which consists of phosphorus pentachloride, quinoline, and diethylaniline, and saponifying the acid halogenides.

9. The process for the manufacture of mono-p-phenoxy-phenyl-phosphoric-ester-acid, which consists in heating hydroquinone-mono-phenyl-ether with phosphorus-oxychloride and saponifying the acid chloride.

10. The process for the manufacture of mono-p-phenoxy-phenyl-phosphoric-ester-acid, which consists in heating hydroquinone-mono-phenyl-ether with phosphorus-oxychloride in the presence of a catalyst selected from the group which consists of phosphorus pentachloride, quinoline, and diethylaniline, and saponifying the acid chloride.

MARCUS GUGGENHEIM.